Dec. 13, 1927.
J. G. RIEFF
1,652,639
MILKING STOOL
Filed Nov. 24, 1926
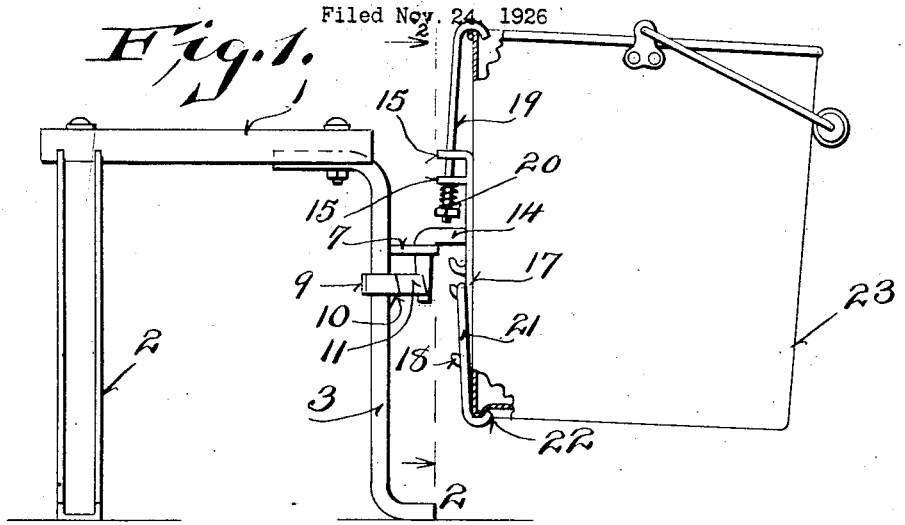
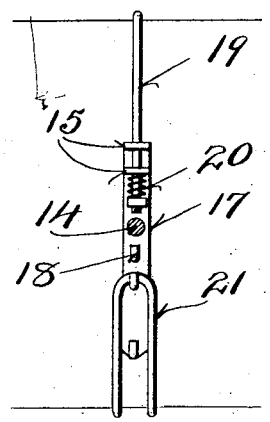
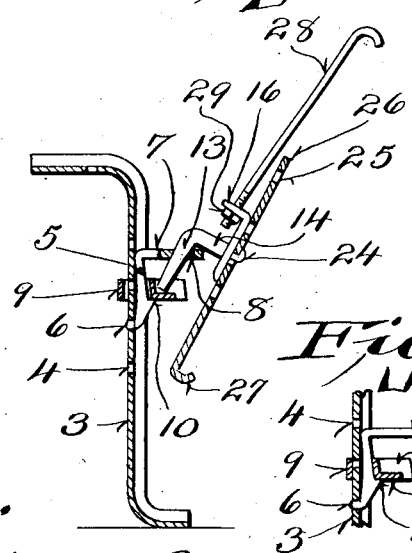
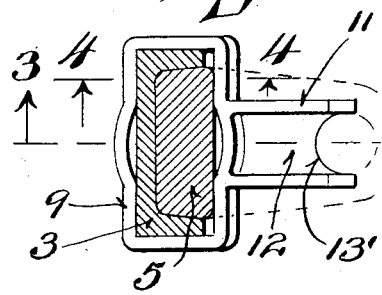
Inventor
John G. Rieff
By
Attorneys Patented Dec. 13, 1927.

1,652,639

UNITED STATES PATENT OFFICE.

JOHN G. RIEFF, OF LONDON, WISCONSIN.

MILKING STOOL.

Application filed November 24, 1926. Serial No. 150,467.

This invention relates to milking stools.

In general, this invention is an improvement over that disclosed in my co-pending application for milking stools, No. 95,223, filed March 17, 1926.

Objects of this invention are to provide a novel form of milking stool having a pail holding device thereon adapted to quickly interlock with the pail to securely hold the pail against inadvertent tilting or spilling, and which will yet permit a quick and positive adjustment of the device to adapt it to grip pails of widely different sizes.

Further objects are to provide a combined stool and pail holder which is so constructed that the pail may be rocked about a vertical axis into any desired position, and which may be quickly changed to permit the pail to be tilted outwardly, if desired, and which may be adjusted to vary the height of the pail.

Embodiments of the invention are shown in the accompanying drawings in which:

Figure 1 is a side elevation partly in section showing the device;

Figure 2 is a sectional view approximately on the line 2—2 of Figure 1;

Figure 3 is a fragmentary sectional view of a modified form showing the pail holder in its tilted position, such view corresponding to a section on the line 3—3 of Figure 5;

Figure 4 is a sectional detail of the height adjusting means, such view corresponding to a section on the line 4—4 of Figure 5;

Figure 5 is a transverse sectional view through the front leg of the stool showing the adjusting means in detail and partly in section.

Referring to the drawings, it will be seen that the stool comprises a seat portion 1 provided with channel iron rear legs 2, preferably formed integral with each other, and with a channel iron front leg 3. The legs are securely bolted to the seat or body portion of the stool, as indicated in Figure 1.

The front leg, as may be seen from Figures 1, 3 and 4, is provided with a plurality of apertures 4, and with a slidable member 5 fitting within the channel of the front leg, and provided with a tongue or ear 6 adapted to fit into any of the apertures. This member is preferably slightly tapered in its upper portion and has an outwardly extending lip 7 provided with an aperture 8. The member 5 is held locked to the front leg by means of a ring-like locking piece 9, as shown most clearly in Figure 3, such locking piece being adapted to rest upon a shoulder 10 of the member 5. This locking piece or ring 9 is provided with a pair of outwardly extending arms 11 which are joined by a central web 12 provided with a semi-circular notch or cutout 13' in its outer side.

Within the aperture 8 of the adjustable member 5 a tongue 13 is positioned and may rest either against the cutout portion 13' assuming the position shown in Figure 1, or may rest within the socket formed between the arms 11 and the web 12, as shown in Figure 3. The tongue 13 is integrally joined to an outwardly projecting arm 14 rigid with a plate 17 provided with a pair of ears 15, as shown in Figure 1, or in the modified form provided with a single ear, as indicated by the reference character 16 in Figure 3. Further, in the form shown in Figure 1, the member 14 is integral with the vertical plate 17, such plate being provided with a plurality of upwardly turned hooks 18. A hooked rod 19 is guided through the ears 15 in the form shown in Figure 1, and is urged downwardly by means of a spring 20. A U-shaped member 21 is hooked over the appropriate hook 18 and is provided with upwardly turned spaced hooks 22 at its lower end adapted to engage the bottom flange of the bucket 23. Thus, it will be seen that a rough adjustment to the size of the bucket is secured by hooking the U-shaped member 21 over the appropriate hook 18 and thereafter hooking the member 19 over the upper edge of the bucket, the spring 20 holding the bucket tightly clamped in place. In the modified form shown in Figure 3, the member 14 is provided with a small hook-like portion 24 which is adapted to engage in any of the apertures 25 formed in the plate 26, such plate being provided with a hook 27 at its lower end adapted to engage the bottom edge of the bucket. Further the ear 16 slidably receives a hooked rod or member 28 which is screw threaded at its lower end and provided with a nut 29 for adjusting such rod.

In using the last described form of the apparatus, it is apparent that the rough adjustment is secured by causing the hook 24 of the member 14 to engage in the appropriate aperture 25. Thereafter, the rod 28 is hooked over the upper edge of the bucket and the nut 29 manipulated to clamp the bucket in place.

In both forms of the device, the prong or tongue 13 may pivotally bear against the cut-out portion 13' of the web 12 of the locking ring, or else may rest upon the flange 12 between the arms 11 to provide for either the vertical positioning of the bucket or else for the outwardly slanting position thereof.

Obviously, the bucket may be rocked into the desired position to thus facilitate adjustment of the device.

Further, the exact height at which the bucket is to stand is secured by sliding the ring 9 upwardly and engaging the tongue 6 in the appropriate aperture 4 in the front leg, thereafter allowing the ring to slip downwardly into the locking position, as shown most clearly in Figures 3 and 4.

Although the invention has been described in considerable detail, such description is intended as illustrative rather than limiting as the invention may be variously embodied and as the scope of such invention is to be determined as claimed.

I claim:

1. The combination of a milking stool having front and rear legs, said front leg being channelled and provided with a series of apertures, an adjustable member mounted within the channel of the front leg and having a tongue adapted to engage any one of said apertures, a ring-like locking member for holding said adjustable member in locking engagement with said front leg, said ring-like member having a socket and a cutaway portion, a pail holder having a tongue pivotally received by said adjustable member and adapted to bear against said cutaway portion or to seat in said socket, and pail engaging means carried by said pail holder and adapted to grip the top and bottom of said pail.

2. The combination of a milking stool having front and rear legs, adjustable means carried by said front leg and adapted to be locked thereto at any desired height, said adjustable means having an aperture in one portion and a spaced socket and cutaway portion in another part thereof, a pail holding member comprising a plate having a tongue adapted to be passed through said aperture and seated within said socket or else bear against said cutaway portion, said plate having a plurality of hooks adjacent its lower part and having an apertured flange adjacent its upper part, a loop shaped member adapted to engage said hooks and having hook-like bottom portions adapted to engage the lower edge of a pail, a rod slidably passing through the apertured flange and having a hook at its upper end adapted to engage the upper edge of the pail, and a spring for urging said rod downwardly to thereby lock said pail in place.

In testimony that I claim the foregoing I have hereunto set my hand at London, in the county of Dane and State of Wisconsin.

JOHN G. RIEFF.